(12) United States Patent
Ikari

(10) Patent No.: US 9,092,915 B2
(45) Date of Patent: Jul. 28, 2015

(54) ROAD SURFACE MANAGEMENT SYSTEM

(71) Applicant: HITACHI CONSTRUCTION MACHINERY CO., LTD., Tokyo (JP)

(72) Inventor: Takanobu Ikari, Tsuchiura (JP)

(73) Assignee: HITACHI CONSTRUCTION MACHINERY CO., LTD., Tokyo (JP)

( * ) Notice: Subject to any disclaimer, the term of this patent is extended or adjusted under 35 U.S.C. 154(b) by 0 days.

(21) Appl. No.: 14/376,620

(22) PCT Filed: Feb. 12, 2013

(86) PCT No.: PCT/JP2013/053297
§ 371 (c)(1),
(2) Date: Aug. 5, 2014

(87) PCT Pub. No.: WO2013/122065
PCT Pub. Date: Aug. 22, 2013

(65) Prior Publication Data
US 2015/0032373 A1    Jan. 29, 2015

(30) Foreign Application Priority Data

Feb. 14, 2012   (JP) ................................. 2012-029863

(51) Int. Cl.
*G07C 5/00* (2006.01)
*G01C 7/04* (2006.01)
*G08G 1/00* (2006.01)
*E01C 23/01* (2006.01)
*G08G 1/123* (2006.01)
*B60W 40/06* (2012.01)

(52) U.S. Cl.
CPC ................. *G07C 5/00* (2013.01); *B60W 40/06* (2013.01); *E01C 23/01* (2013.01); *G01C 7/04* (2013.01); *G08G 1/00* (2013.01); *G08G 1/123* (2013.01); *B60W 2510/22* (2013.01); *B60W 2520/10* (2013.01); *B60W 2550/402* (2013.01)

(58) Field of Classification Search
CPC ............ E01C 23/01; G01C 7/04; G07C 5/00; G08G 1/00; G08G 1/123; B60W 2550/402; B60W 40/06; B60W 2510/22; B60W 2520/10
See application file for complete search history.

(56) References Cited

U.S. PATENT DOCUMENTS 6,184,784 B1 *   2/2001  Shibuya ........................ 340/438
2005/0167164 A1 *  8/2005  Takeda ........................... 177/136
(Continued)

FOREIGN PATENT DOCUMENTS

JP       04-115399 A       4/1992
JP       2003-345242 A    12/2003
(Continued)

OTHER PUBLICATIONS

International Preliminary Report on Patentability received in International Application No. PCT/JP2013/053297 dated Aug. 28, 2014.

*Primary Examiner* — Mary Cheung
*Assistant Examiner* — Rodney Butler
(74) *Attorney, Agent, or Firm* — Mattingly & Malur, PC

(57) ABSTRACT

A road surface management system is capable of detecting road surface conditions that tend to damage dump trucks and displaying the positions of such road surfaces. When the traveling speed of the dump truck is higher than or equal to a preset threshold value, the server judges whether or not each of the pressures of suspensions of the dump truck detected by pressure sensors is within a reference range which has been set corresponding to each suspension. The server judges that the road surface at the position of a dump truck is in a poor condition if one of the pressures of the four suspensions of the dump truck is judged to be outside the reference range and the remaining three pressures are judged to be within the reference range. The positions of the road surfaces judged to be in the poor condition are displayed on an indicator.

7 Claims, 8 Drawing Sheets

(56) References Cited

U.S. PATENT DOCUMENTS

2008/0092849 A1* 4/2008 Mizuguchi ............... 123/339.16
2011/0010040 A1* 1/2011 Ichinose et al. ................. 701/29
2011/0276215 A1* 11/2011 Wendling et al. ............... 701/29

FOREIGN PATENT DOCUMENTS

| | | |
|---|---|---|
| JP | 2006-082755 A | 3/2006 |
| JP | 2010-242345 A | 10/2010 |
| JP | 2011-018132 A | 1/2011 |

* cited by examiner

A: EXCAVATOR
B: DUMP TRUCK
C: DOZER
D: POOR ROAD SURFACE CONDITION

ROAD SURFACE MANAGEMENT SYSTEM

TECHNICAL FIELD

The present invention relates to a road surface management system for managing the road surface condition of traveling lanes for dump trucks used in quarries or construction sites.

BACKGROUND ART

In quarries or construction sites, a plurality of dump trucks are operated in order to carry the excavated materials (rocks, earth, sand, etc.). Each dump truck travels on a traveling lane to and fro between the loading site and the unloading/dumping site. If the road surface of the traveling lane for the dump trucks has irregularities, the dump trucks suffer influences such as excessive fuel consumption and tire wear, as well as giving discomfort to the driver. In order to resolve such problems, a road surface repairing system for detecting and repairing the road surface irregularities has been proposed (see Patent Document 1, for example).

In the road surface repairing system described in the Patent Document 1, a millimeter wave sensor is arranged at the front of each dump truck. The millimeter wave sensor detects the distance from the installation position of the millimeter wave sensor to the road surface of the traveling lane by irradiating the road surface with a transmitted wave and receiving a reflected wave from the road surface. A control unit installed in each dump truck judges the irregularities of the road surface based on the detected result by the millimeter wave sensor. Specifically, the distance from the installation position of the millimeter wave sensor to the road surface of a flat road/land having no irregularities is defined as a reference value. The control unit judges that the road surface on which the dump truck is traveling has significant irregularities needing repair if the distance detected by the millimeter wave sensor is longer or shorter than the reference value by a prescribed value or more.

When the aforementioned control unit of the dump truck judges that the road surface has significant irregularities needing repair, the control unit stores the position of the dump truck calculated by a GPS device as the position of the damaged road surface. The control unit also generates the traveling path (locus) of the dump truck based on the position record of the dump truck. The control unit of each dump truck transmits the road surface irregularity position information and the traveling path information to a management station.

A control unit of the management station receives the road surface irregularity position information and the traveling path information from the dump trucks and generates repair map data, indicating the positions of the traveling lanes (road surfaces) needing repair, based on the received information. Then, the control unit of the management station transmits the generated repair map data to road repair vehicles (e.g., motor graders). A control unit installed in each road repair vehicle receives the repair map data from the management station and displays the repair map data on an indicator. Consequently, the drivers of the road repair vehicles can drive the road repair vehicles to the positions needing repair displayed on the indicators and carry out the repair work at the positions.

PRIOR ART DOCUMENTS

Patent Document

Patent Document 1: JP, A-2010-242345

SUMMARY OF THE INVENTION

Problem to be Solved by the Invention

In the road surface repairing system of the Patent Document 1, the distance to the road surface is detected by using the millimeter wave sensor and the irregularities of the road surface in the traveling direction of the dump truck are judged based on the result of the detection of the distance. However, the actual road surface condition that tends to damage the traveling dump truck is a road surface condition causing a twist to the vehicle body of the dump truck, rather than the aforementioned road surface condition having irregularities in the traveling direction of the dump truck (i.e., road surface condition that tilts the vehicle body of the dump truck in the traveling direction). For example, when a dump truck traveling on a road surface having a wheel track (left by another dump truck that previously traveled on the road surface) crosses the wheel track in a different direction from the wheel track, a twist can be caused to the vehicle body of the dump truck. Further, when the load on a dump truck has fallen onto the road surface and another dump truck runs onto the fallen load with one of the four wheels, a twist can be caused to the vehicle body of the dump truck. Therefore, detecting and repairing such road surface conditions are critically important from the viewpoint of the operating life of the dump trucks.

The object of the present invention, which has been made in consideration of the above-described situation, is to provide a road surface management system capable of detecting road surface conditions that tend to damage the dump trucks and displaying the positions of such road surfaces.

Means for Solving the Problem (1) To achieve the above object, the present invention provides a road surface management system for managing the road surface condition of traveling lanes for dump trucks used in quarries or construction sites, comprising: suspension state quantity detection means which detect state quantities of four suspensions provided corresponding to the left front, right front, left rear, and right rear wheels of each dump truck; position acquisition means which acquires the position of the dump truck; traveling speed detection means which detects the traveling speed of the dump truck; traveling judgment means which judges that the dump truck is traveling if the traveling speed of the dump truck detected by the traveling speed detection means is higher than or equal to a preset threshold value; suspension state quantity judgment means which judges whether each of the state quantities of the four suspensions detected by the suspension state quantity detection means is within a reference range which has been set for each suspension or not in regard to each position of the traveling dump truck; road surface condition judgment means which judges that the road surface at the position of a dump truck is in a poor condition if one of the state quantities of the four suspensions of the dump truck is judged to be outside the reference range and the remaining three state quantities are judged to be within the reference range; and display means which displays the positions of the road surfaces judged by the road surface condition judgment means to be in the poor condition.

In the present invention configured as above, when one of the state quantities of the four suspensions is judged to be outside the reference range and the remaining three state quantities are judged to be within the reference range, the road surface at the corresponding position of the dump truck is judged to be in the poor condition (condition causing a twist to the vehicle body of the dump truck) and the position of the road surface is displayed. Thus, according to the present invention, road surface conditions that tend to damage the dump trucks can be detected and the positions of such road surfaces can be displayed. Consequently, the repair of such road surfaces tending to damage the dump trucks is made possible and the operating life of the dump trucks can be extended.

(2) Preferably, in the above road surface management system (1), the suspension state quantity judgment means includes: reference value setting means which sets a reference value for each of the state quantities of the four suspensions according to a live load and a vehicle body tilting angle of the dump truck; influence degree calculation means which calculates influence degrees of the four suspensions by dividing the state quantities of the four suspensions detected by the suspension state quantity detection means respectively by the corresponding reference values; influence coefficient calculation means which calculates the average value of the influence degrees of the four suspensions calculated by the influence degree calculation means and calculates influence coefficients as the ratios of the influence degrees of the four suspensions to the average value in regard to each position of the traveling dump truck; and influence coefficient judgment means which judges whether the influence coefficients of the four suspensions calculated by the influence coefficient calculation means are within a preset range or not in regard to each position of the traveling dump truck. The road surface condition judgment means judges that the road surface at the position of a dump truck is in the poor condition if one of the influence coefficients of the four suspensions of the dump truck is judged to be outside the preset range and the remaining three influence coefficients are judged to be within the preset range.

(3) Preferably, the above road surface management system (2) comprises stepped evaluation means which evaluates the poor condition of the road surface in a stepped manner based on the magnitude of the influence coefficient outside the preset range in the case where one of the influence coefficients of the four suspensions is judged to be outside the preset range and the remaining three influence coefficients are judged to be within the preset range. The display means displays the positions of the road surfaces judged by the road surface condition judgment means to be in the poor condition together with stages of the poor condition evaluated by the stepped evaluation means.

(4) Preferably, in any one of the above road surface management systems (1)-(3), each of the four suspensions is implemented by a hydraulic cylinder. The suspension state quantity detection means detect pressures of the four hydraulic cylinders as the state quantities of the four suspensions.

(5) Preferably, in any one of the above road surface management systems (1)-(4), the road surface management system comprises traveling path generation means which generates a traveling path of each dump truck based on a position record of the dump truck acquired by the position acquisition means. The display means displays the traveling paths of the dump trucks generated by the traveling path generation means together with the positions of the road surfaces judged by the road surface condition judgment means to be in the poor condition.

(6) Preferably, in any one of the above road surface management systems (1)-(5), the display means is installed in at least one of a management station and a road repair vehicle.

(7) Preferably, in the above road surface management system (6), the display means is installed in the dump truck.

Effect of the Invention

According to the present invention, road surface conditions that tend to damage the dump trucks can be detected and the positions of such road surfaces can be displayed.

MODES FOR CARRYING OUT THE INVENTION

Figure 1:
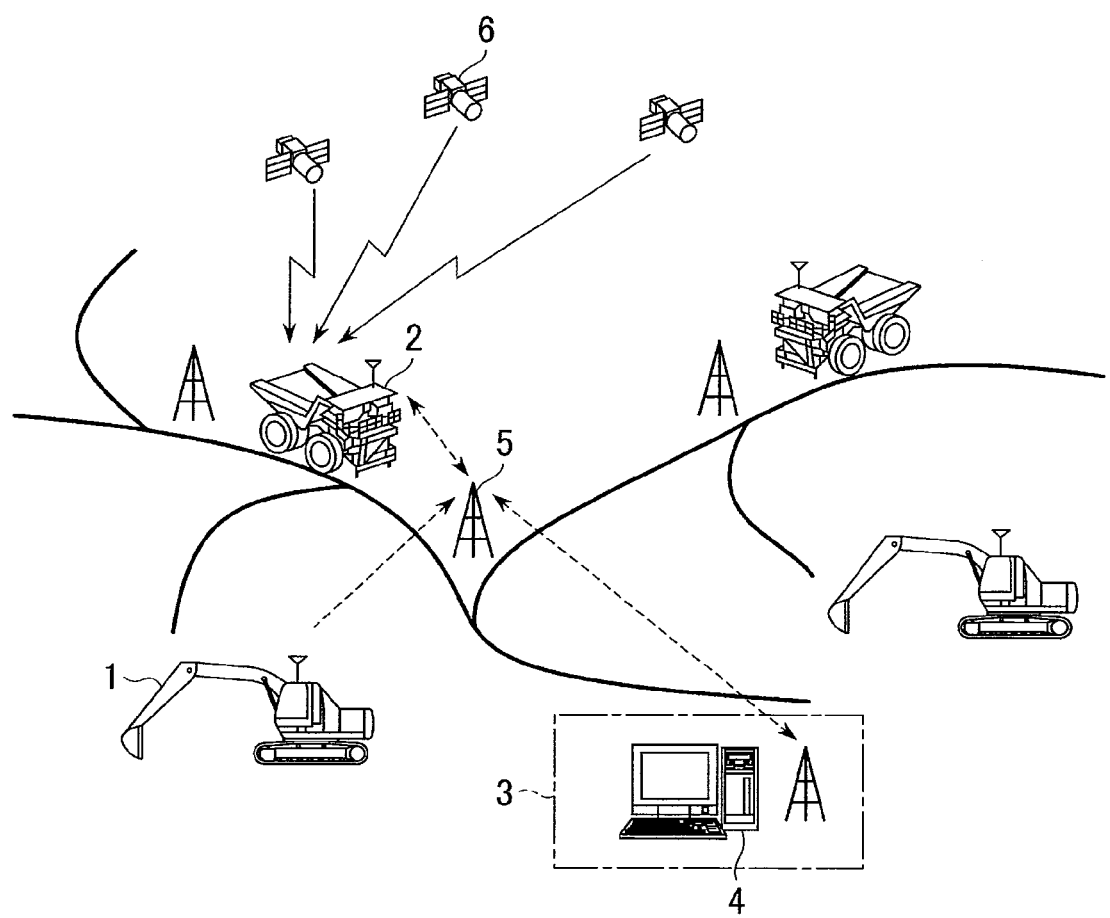
FIG. 1 is a schematic diagram showing the overall configuration of a traffic management system in accordance with a first embodiment of the present invention.

Referring now to the drawings, a description will be given in detail of preferred embodiments of a road surface management system in accordance with the present invention. The following description will be given by taking a traffic management system for managing vehicles operated in quarries or construction sites as an example.

Figure 2:
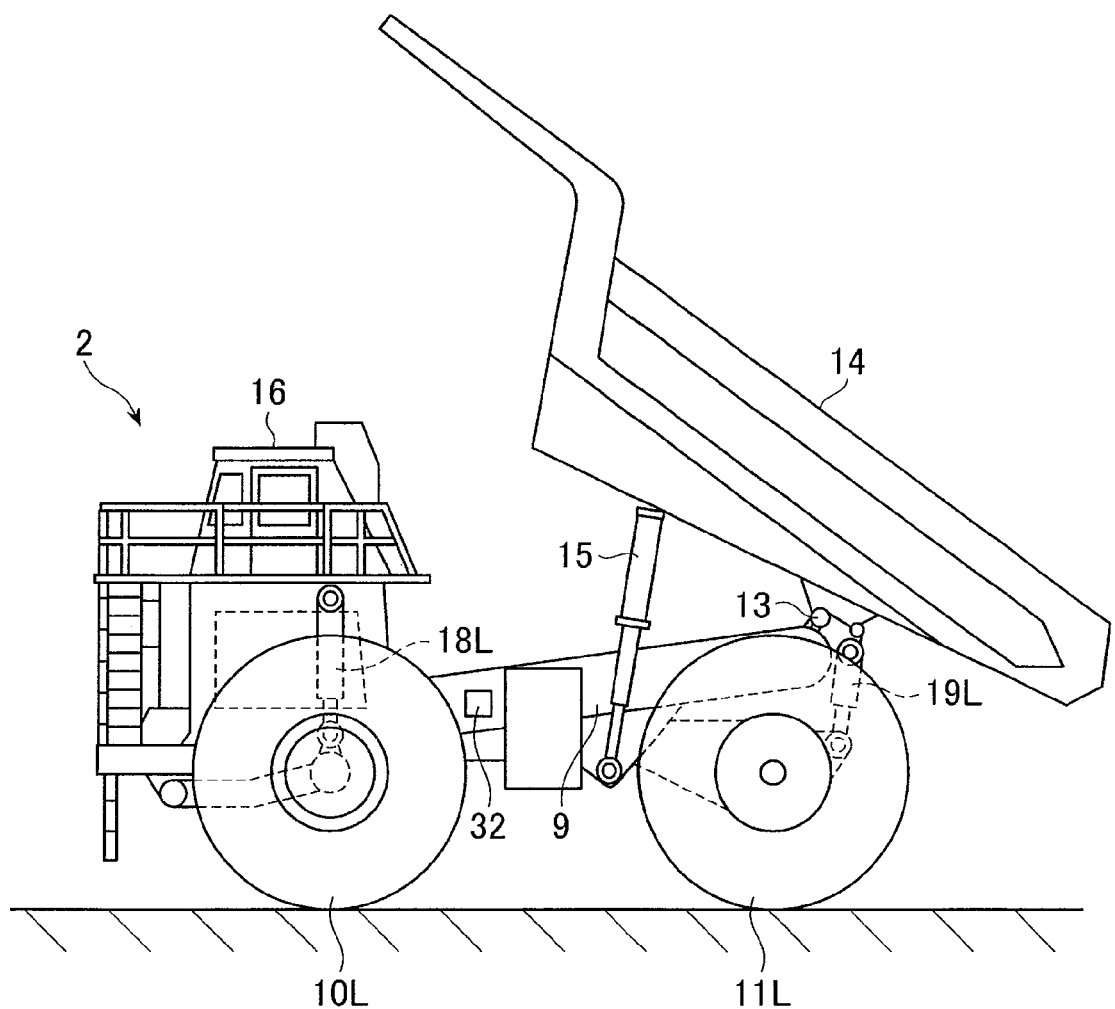
FIG. 2 is a side view showing an example of the structure of a dump truck shown in FIG. 1.
Figure 3:
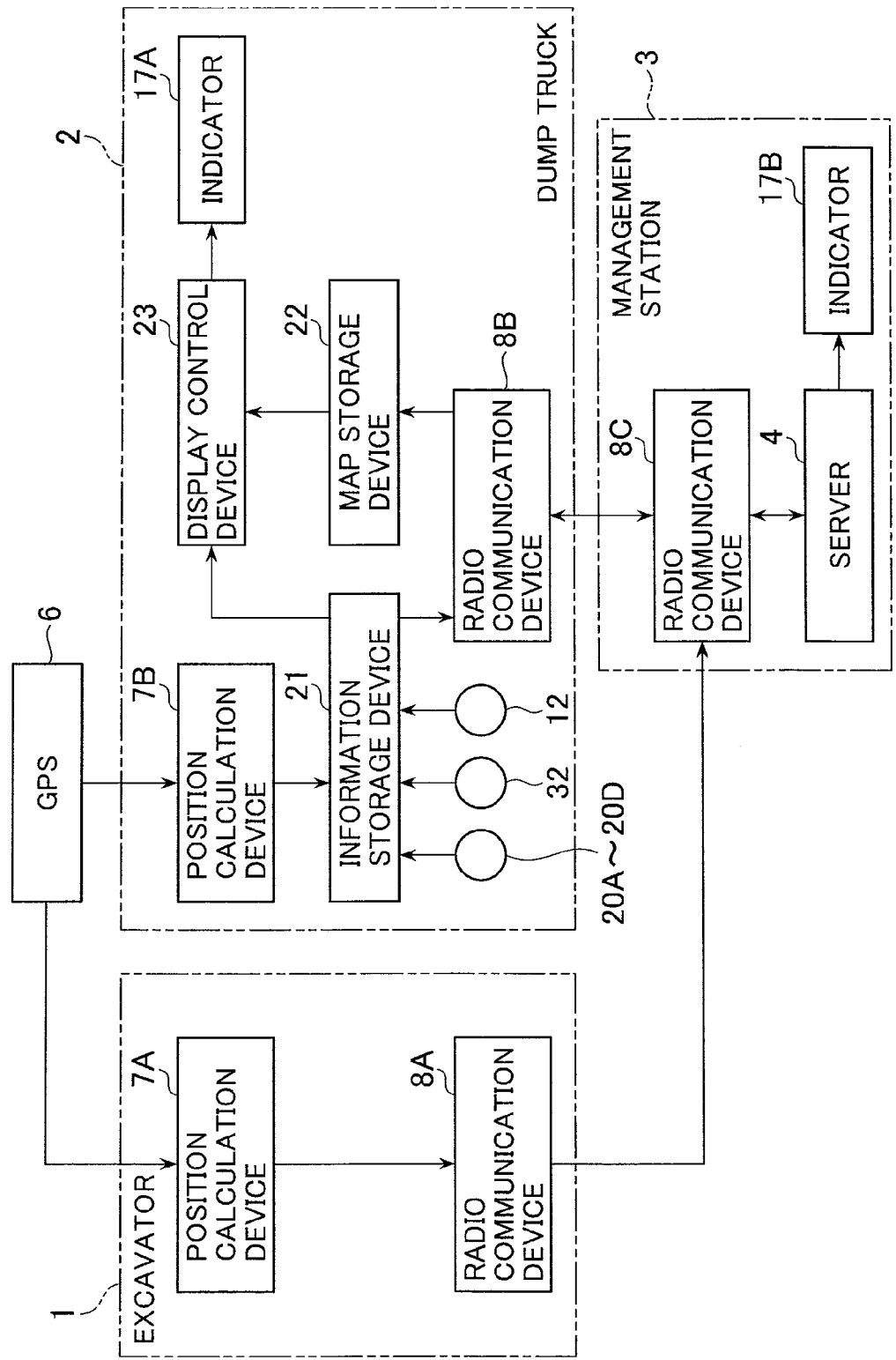
FIG. 3 is a block diagram showing the control configuration of the traffic management system in accordance with the first embodiment of the present invention.

FIG. 1 is a schematic diagram showing the overall configuration of a traffic management system in accordance with a first embodiment of the present invention. FIG. 2 is a side view showing an example of the structure of a dump truck shown in FIG. 1. FIG. 3 is a block diagram showing the control configuration of the traffic management system in accordance with the first embodiment of the present invention.

In quarries or construction sites, a plurality of excavators 1 for performing the excavation work, loading operation, etc. and a plurality of dump trucks 2 for carrying the materials (rocks, earth, sand, etc.) excavated by the excavators 1 from the loading site (where the excavators 1 are situated) to unloading/dumping sites are operated as shown in FIG. 1, for example. In the traffic management system of this embodiment, a server 4 is installed in a management station 3 (specifically, a management office set up in the vicinity of the quarry or construction site or at a remote place). The server 4, communicating information with the excavators 1 and the dump trucks 2 via radio relay stations 5, manages the positions of the excavators 1 and the dump trucks 2 while also managing the road surface condition of the traveling lanes for the dump trucks 2.

As shown in FIG. 3, each excavator 1 is equipped with a position calculation device 7A for calculating the current position of the excavator 1 based on signals received from GPS satellites 6 and a radio communication device 8A for transmitting the positional information of the excavator 1 calculated by the position calculation device 7A to the management station 3.

As shown in FIG. 2, each dump truck 2 comprises a vehicle body 9, left and right front wheels 10L and 10R (only the left front wheel 10L is shown in FIG. 2) arranged in a lower front part of the vehicle body 9 to be rotatable, left and right rear wheels 11L and 11R (only the left rear wheel 11L is shown in FIG. 2) arranged in a lower rear part of the vehicle body 9 to be rotatable, a speed sensor 12 (see FIG. 3) for detecting the traveling speed of the dump truck 2, an angle sensor 32 for detecting the tilting angle of the vehicle body 9, a bed 14 arranged in an upper rear part of the vehicle body 9 to be rotatable (tiltable) in the vertical direction via a hinge pin 13, a dump cylinder 15 for rotating the bed 14 with respect to the vehicle body 9, and a cab 16 (driver's cabin) arranged in an upper front part of the vehicle body 9. Arranged in the cab 16 are a driver seat, a steering wheel and pedals to be operated for the traveling of the dump truck 2, a lever for operating the bed, an indicator (e.g., liquid crystal display) 17A (see FIG. 3), etc.

Front wheel suspensions 18L and 18R (only the front wheel suspension 18L is shown in FIG. 2) are arranged between the vehicle body 9 and the front wheels 10L and 10R, respectively. Rear wheel suspensions 19L and 19R (only the rear wheel suspension 19L is shown in FIG. 2) are arranged between the vehicle body 9 and the rear wheels 11L and 11R, respectively. Each of the four suspensions 18L, 18R, 19L, and 19R is implemented by a hydraulic cylinder. Four pressure sensors 20A-20D (see FIG. 3) are arranged to detect the pressures of the hydraulic cylinders (suspensions 18L, 18R, 19L, and 19R). Incidentally, when the dump truck 2 is traveling on a flat road/land having no irregularities, the support load on the front wheel suspensions 18L and 18R and the support load (reaction force) on the rear wheel suspensions 19L and 19R differ from each other due to factors such as the difference in the number of wheels between the front wheels 10L and 10R (one wheel on each side) and the rear wheels 11L and 11R (two wheels on each side). Thus, the pressures of the rear wheel suspensions 19L and 19R are higher than those in the front wheel suspensions 18L and 18R.

The dump truck 2 further comprises a position calculation device 7B, an information storage device 21, a radio communication device 8B, a map storage device 22 and a display control device 23 as shown in FIG. 3. The position calculation device 7B calculates the current position of the dump truck 2 based on signals received from GPS satellites 6. The information storage device 21 periodically collects or calculates various types of data (including the positional information of the dump truck 2 calculated by the position calculation device 7B) and stores the collected/calculated data while associating them with the time. The radio communication device 8B transmits the data stored in the information storage device 21 to the management station 3 while receiving map data (details will be explained later) from the management station 3. The map storage device 22 stores the map data received from the management station 3. The display control device 23 makes the indicator 17A display the map stored in the map storage device 22, the current position of the dump truck 2, and other data stored in the information storage device 21 (e.g., current traveling speed, live load, vehicle body tilting angle, etc.).

Besides the position of the dump truck 2 calculated by the position calculation device 7B, the information storage device 21 collects various types of data such as the traveling speed of the dump truck 2 detected by the traveling speed sensor 12, the vehicle body tilting angle of the dump truck 2 detected by the angle sensor 32, and the pressures of the suspensions 18L, 18R, 19L, and 19R detected by the pressure sensors 20A-20D, and stores the collected data while associating them with the time.

The information storage device 21 also has a function of calculating the live load on the bed 14 (live load calculation means). Specifically, the information storage device 21 judges whether the dump truck 2 is traveling or not by judging whether or not the traveling speed of the dump truck 2 is higher than or equal to a preset threshold value (several km/h), for example. Then, the information storage device 21 calculates the support load on each suspension 18L, 18R, 19L, 19R by multiplying the pressure of each suspension 18L, 18R, 19L, 19R (when the dump truck 2 was judged to be traveling) by the cross-sectional area of the corresponding hydraulic cylinder, calculates the total support load by adding up the support loads on the suspensions 17L, 17R, 18L, and 18R, and calculates the live load by subtracting the empty weight of the vehicle body 9 and the bed 14 from the total support load. The information storage device 21 stores the calculated live load while associating it with the time.

The management station 3 is equipped with the server 4, a radio communication device 8C and an indicator 17B as shown in FIG. 3. The server 4 receives the positional information from the excavators 1 and the data including the positional information from the dump trucks 2 via the radio communication device 8C. Based on the data received from the dump trucks 2, the server 4 generates a map (explained later) and stores the generated map. The server 4 makes the indicator 17B display the generated map together with the current positions of the excavators 1 and the dump trucks 2. Further, the server 4 transmits data of the generated map to the dump trucks 2 via the radio communication device 8C.

Figure 4:
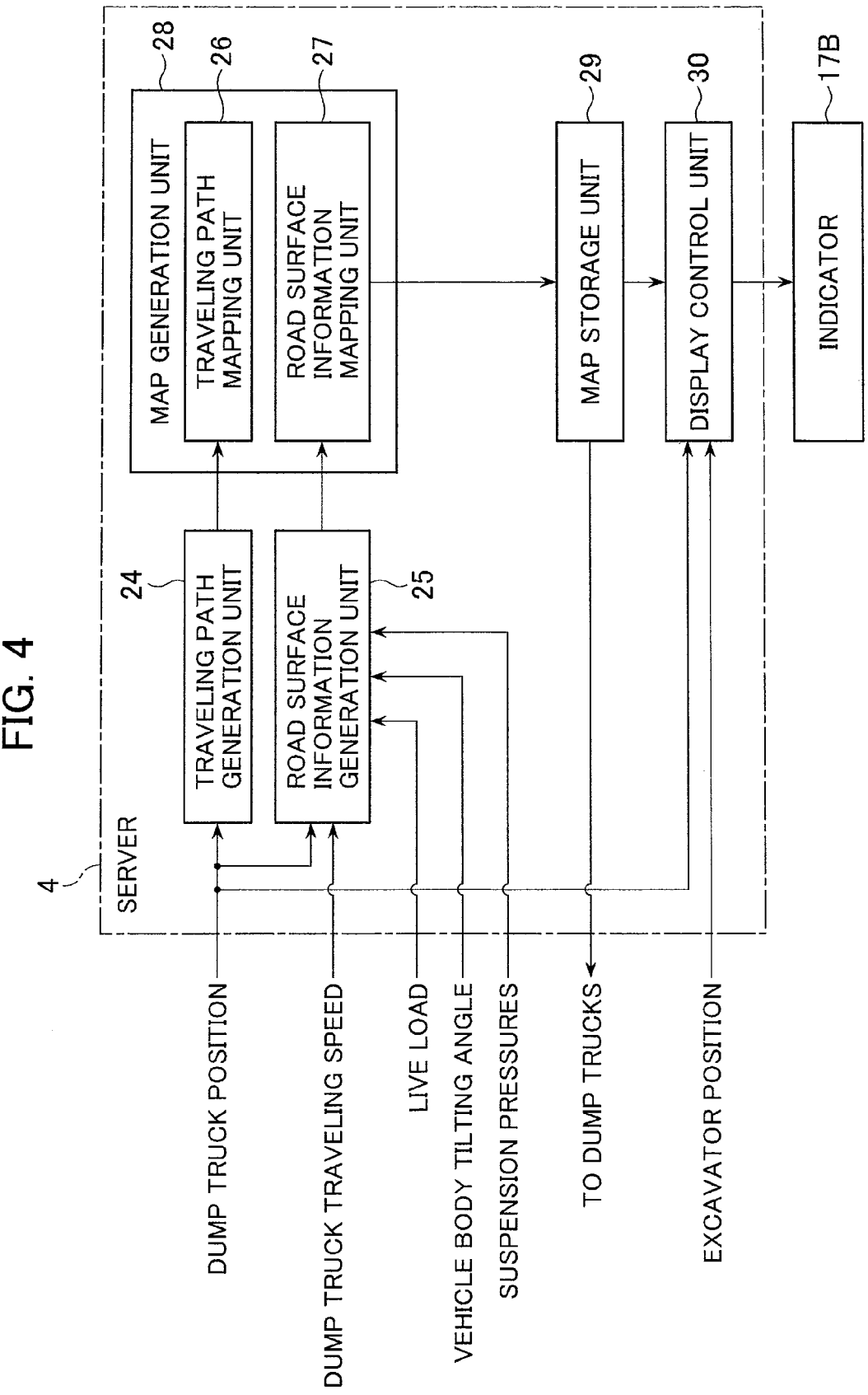
FIG. 4 is a block diagram showing the functional configuration of a server of a management station shown in FIG. 3.

Next, the above-described server 4 of the management station 3 will be explained in more detail. FIG. 4 is a block diagram showing the functional configuration of the server 4.

The server 4 of the management station 3 includes a traveling path generation unit 24, a road surface information generation unit 25, a map generation unit 28, a map storage unit 29 and a display control unit 30. The traveling path generation unit 24 generates the traveling path of each dump truck 2 based on the position record of the dump truck 2. The road surface information generation unit 25 judges the road surface condition of the traveling path of each dump truck 2 based on the traveling speed, the live load, the vehicle body tilting angle, and the pressures of the suspensions 18L, 18R, 19L, and 19R of the dump truck 2 and generates road surface information by associating the result of the judgment with the position of the dump truck 2. The map generation unit 28 includes a traveling path mapping unit 26 and a road surface information mapping unit 27. The traveling path mapping unit 26 adds the traveling paths of the dump trucks 2 generated by the traveling path generation unit 24 to a previously acquired map of the quarry or construction site. The road surface information mapping unit 27 adds the road surface information generated by the road surface information generation unit 25 to the map. The map storage unit 29 stores data of the map generated by the map generation unit 28. The display control unit 30 displays the map stored in the map storage unit 29 on the indicator 17B together with the current positions of the excavators 1 and the dump trucks 2.

In this embodiment, the map data stored in the map storage unit 29 of the server 4 is transmitted to the dump trucks 2 via the radio communication device 8C. As mentioned above, the map storage device 22 of each dump truck 2 stores the map data received from the management station 3 via the radio communication device 8B, and the display control device 23 displays the map stored in the map storage device 22 on the indicator 17A together with the current position of the dump truck 2.

The road surface information generation unit 25 (as the principal part of this embodiment) is configured to judge that the road surface at the position of a traveling dump truck 2 is in a poor condition (condition causing a twist to the vehicle body 9 of the dump truck 2) if one of the four pressures of the suspensions 18L, 18R, 19L, and 19R of the dump truck 2 is judged to be outside a reference range and the remaining three pressures are judged to be within the reference range. Such a process performed by the road surface information generation unit 25 will be explained below.

Figure 5:
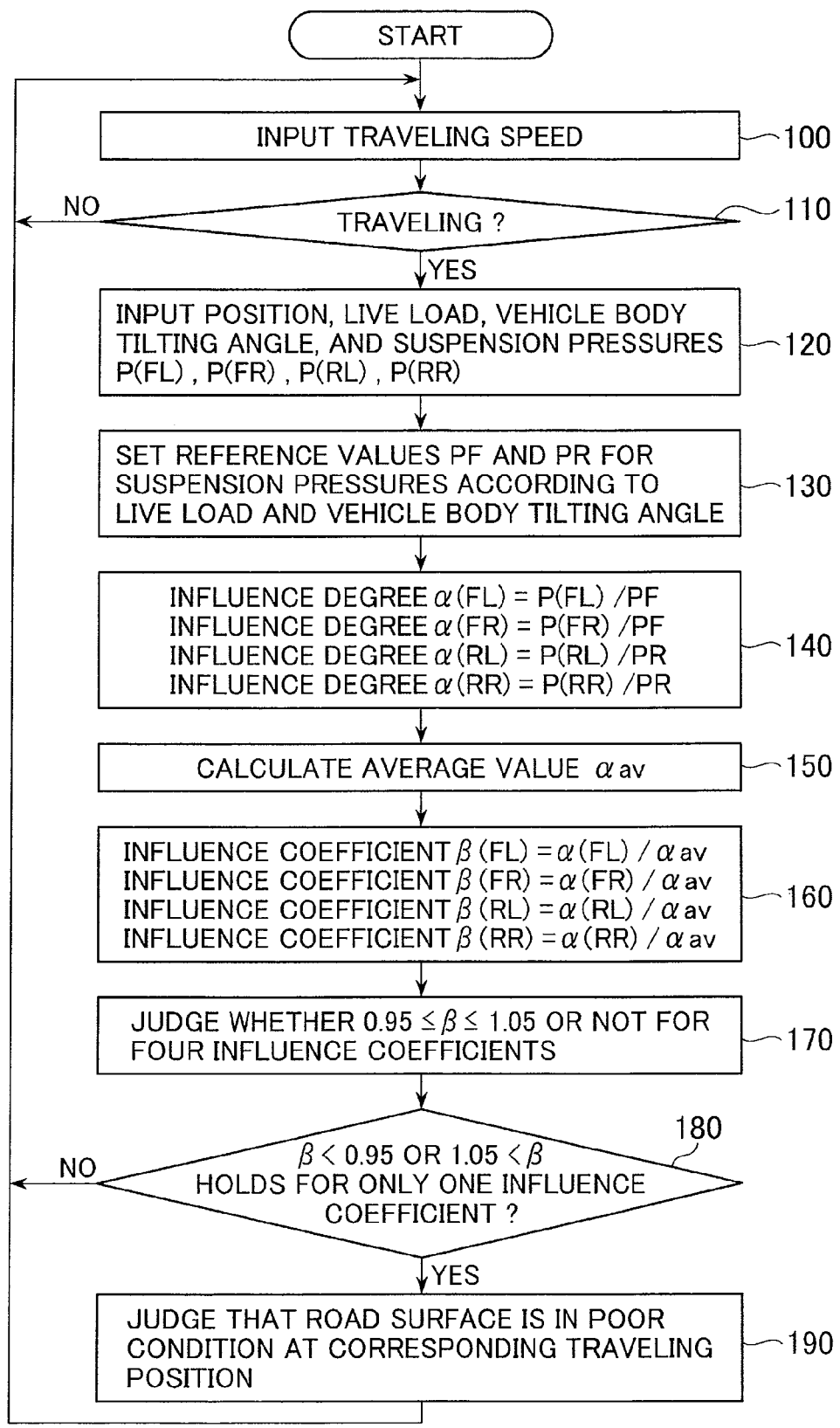
FIG. 5 is a flow chart showing a control process executed by a road surface information generation unit of the server of the management station shown in FIG. 3.

FIG. 5 is a flow chart showing a process executed by the road surface information generation unit 25 of the server 4.

In the first step 100, the traveling speed of a dump truck 2 at a certain time is inputted. In the next step 110, the road surface information generation unit 25 judges whether the dump truck 2 is traveling or not by judging whether or not the inputted traveling speed of the dump truck 2 is higher than or equal to a preset threshold value (several km/h). When the dump truck 2 is judged to be not traveling (i.e., when the traveling speed is less than the threshold value), the condition of the step 110 is not satisfied and the process returns to the step 100, in which the traveling speed of the dump truck 2 at a different time is inputted. In contrast, when the dump truck 2 is judged to be traveling (i.e., when the traveling speed is higher than or equal to the threshold value), the process advances to step 120.

In the step 120, the position, the live load, the vehicle body tilting angle, and the pressures P(FL), P(FR), P(RL) and P(RR) of the four suspensions 18L, 18R, 19L, and 19R of the dump truck 2 at the same time are inputted. In the next step 130, the road surface information generation unit 25 sets a reference value PF for the pressures P(FL) and P(FR) of the front wheel suspensions 18L and 18R and a reference value PR for the pressures P(RL) and P(RR) of the rear wheel suspensions 19L and 19R according to the inputted live load and vehicle body tilting angle. Specifically, the reference value PF equals the pressure of each front wheel suspension 18L, 18R when the dump truck 2 travels at a constant speed on a road surface having no irregularities. Similarly, the reference value PR equals the pressure of each rear wheel suspension 19L, 19R when the dump truck 2 travels at the constant speed on the road surface having no irregularities. Correlation data between combinations of the live load and the vehicle body tilting angle, and the reference values PF and PR have been prestored in the server 4. The road surface information generation unit 25 loads reference values PF and PR corresponding to the live load and the vehicle body tilting angle inputted in the step 120.

In the next step 140, the road surface information generation unit 25 calculates influence degrees α(FL) and α(FR) of the front wheel suspensions 18L and 18R by dividing the pressures P(FL) and P(FR) of the front wheel suspensions 18L and 18R (inputted in the step 120) by the reference value PF. Similarly, the road surface information generation unit 25 calculates influence degrees α(RL) and α(RR) of the rear wheel suspensions 19L and 19R by dividing the pressures P(RL) and P(RR) of the rear wheel suspensions 19L and 19R (inputted in the step 120) by the reference value PR. In the next step 150, the road surface information generation unit 25 calculates the average value αav of the four influence degrees α(FL), α(FR), α(RL) and α(RR). In the next step 160, the road surface information generation unit 25 calculates an influence coefficient β(FL) as the ratio of the influence degree α(FL) to the average value αav, an influence coefficient β(FR) as the ratio of the influence degree α(FR) to the average value αav, an influence coefficient β(RL) as the ratio of the influence degree α(RL) to the average value αav, and an influence coefficient β(RR) as the ratio of the influence degree α(RR) to the average value αav.

In the next step 170, the road surface information generation unit 25 judges whether or not the four influence coefficients β(FL), β(FR), β(RL) and β(RR) are within a preset range (e.g., 0.95≤β≤1.05), that is, whether or not |β(FL)−1|, |β(FR)−1|, |β(RL)−1| and |β(RR)−1| are within a preset value (e.g., 0.05). The condition of the step 180 is not satisfied when the four influence coefficients are outside the preset range (e.g., β<0.95 or 1.05<β), when three influence coefficients are outside the preset range and the remaining one influence coefficient is within the preset range, and when two influence coefficients are outside the preset range and the remaining two influence coefficients are within the preset range, for example. In these cases, the process returns to the step 100 and the traveling speed of the dump truck 2 at a different time is inputted.

In contrast, when one influence coefficient is outside the preset range and the remaining three influence coefficients are within the preset range, for example, the condition of the step 180 is satisfied and the process advances to step 190. In the step 190, the road surface information generation unit 25 judges that the road surface at the position of the dump truck 2 inputted in the step 120 is in a poor condition and outputs the road surface information to the road surface information mapping unit 27.

In the system described above, the pressure sensors 20A-20D constitute suspension state quantity detection means which detect state quantities of four suspensions provided corresponding to the left front, right front, left rear, and right rear wheels of each dump truck described in the CLAIMS. The position calculation device 7B constitutes position acquisition means which acquires the position of the dump truck. The speed sensor 12 constitutes traveling speed detection means which detects the traveling speed of the dump truck. The step 110 in FIG. 5 executed by the road surface information generation unit 25 of the server 4 constitutes traveling judgment means which judges that a dump truck is traveling if the traveling speed of the dump truck detected by the traveling speed detection means is higher than or equal to a preset threshold value.

The steps 120-170 in FIG. 5 executed by the road surface information generation unit 25 of the server 4 constitute suspension state quantity judgment means which judges whether each of the state quantities of the four suspensions detected by the suspension state quantity detection means is within a reference range which has been set for each suspension or not in regard to each position of the traveling dump truck. Specifically, the step 130 in FIG. 5 executed by the road surface information generation unit 25 of the server 4 constitutes reference value setting means which sets a reference value for each of the state quantities of the four suspensions according to the live load and the vehicle body tilting angle of the dump truck. The step 140 in FIG. 5 executed by the road surface information generation unit 25 of the server 4 constitutes influence degree calculation means which calculates influence degrees of the four suspensions by dividing the state quantities of the four suspensions detected by the suspension state quantity detection means respectively by the corresponding reference values. The steps 150 and 160 in FIG. 5 executed by the road surface information generation unit 25 of the server 4 constitute influence coefficient calculation means which calculates the average value of the influence degrees of the four suspensions calculated by the influence degree calculation means and calculates influence coefficients as the ratios of the influence degrees of the four suspensions to the average value in regard to each position of the traveling dump truck. The step 170 in FIG. 5 executed by the road surface information generation unit 25 of the server 4 constitutes influence coefficient judgment means which judges whether the influence coefficients of the four suspensions calculated by the influence coefficient calculation means are within a preset range or not in regard to each position of the traveling dump truck.

The step 180 in FIG. 5 executed by the road surface information generation unit 25 of the server 4 constitutes road surface condition judgment means which judges that the road surface at the position of a dump truck is in a poor condition if one of the state quantities of the four suspensions of the dump truck is judged to be outside the reference range and the remaining three state quantities are judged to be within the reference range, or road surface condition judgment means which judges that the road surface at the position of a dump truck is in a poor condition if one of the influence coefficients of the four suspensions of the dump truck is judged to be outside the preset range and the remaining three influence coefficients are judged to be within the preset range.

The traveling path generation unit 24 of the server 4 constitutes traveling path generation means which generates the traveling path of each dump truck based on the position record of the dump truck acquired by the position acquisition means. The indicators 17A and 17B constitute display means which displays the positions of the road surfaces judged by the road surface condition judgment means to be in the poor condition, or display means which displays the traveling paths of the dump trucks generated by the traveling path generation means together with the positions of the road surfaces judged by the road surface condition judgment means to be in the poor condition.

The operation and effect of this embodiment configured as above will be described below.

Figure 6:
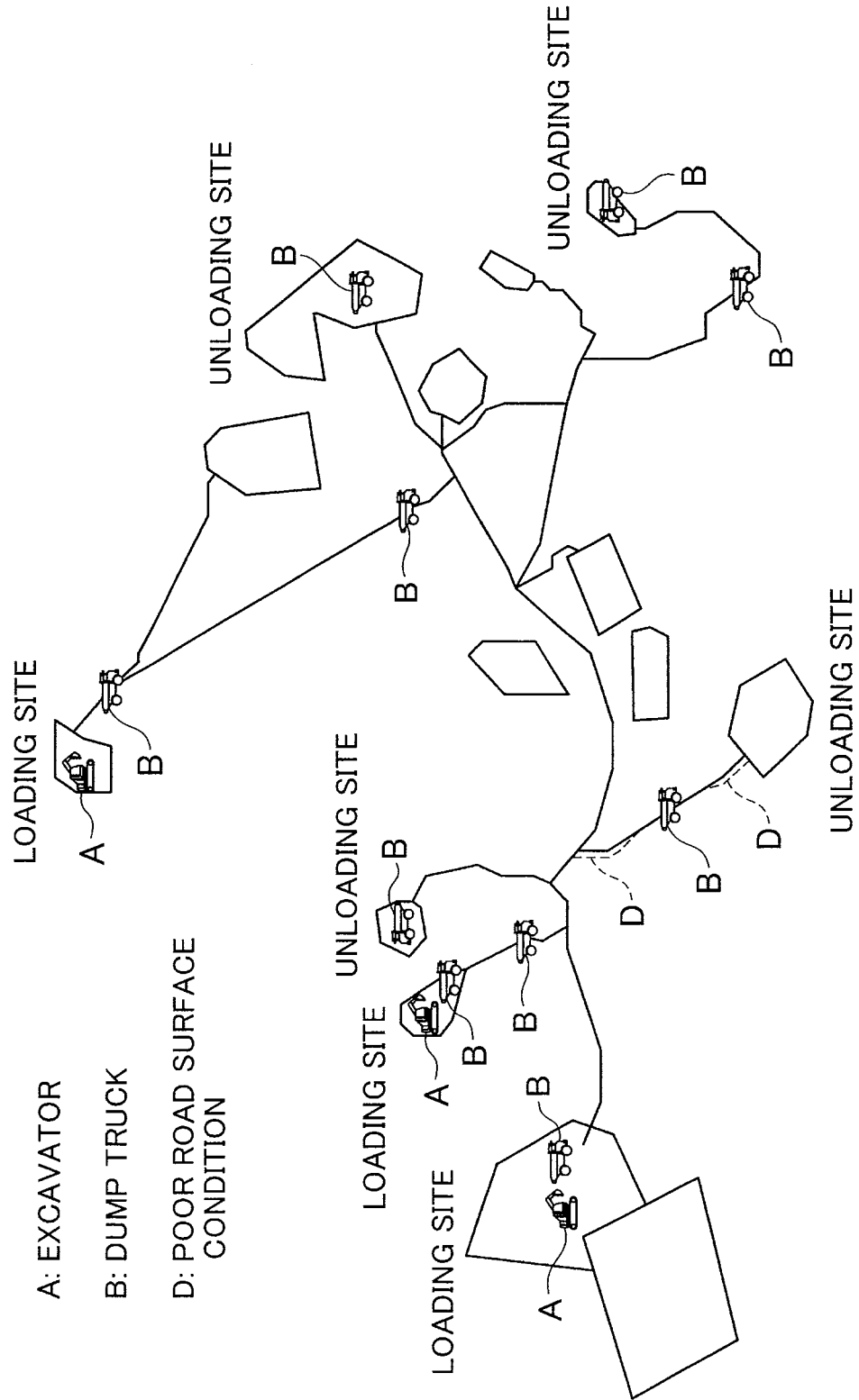
FIG. 6 is a schematic diagram showing an example of an overall view display screen which is displayed by an indicator of the management station shown in FIG. 3.

As shown in FIG. 6 (overall view display screen), for example, the indicator 17B of the management station 3 shows the map display of a plurality of loading sites and unloading sites together with the mark display of the current positions of a plurality of excavators 1. The indicator 17B also shows the map display of the traveling paths of a plurality of dump trucks 2 together with the mark display of the current positions of the dump trucks 2.

Figure 7:
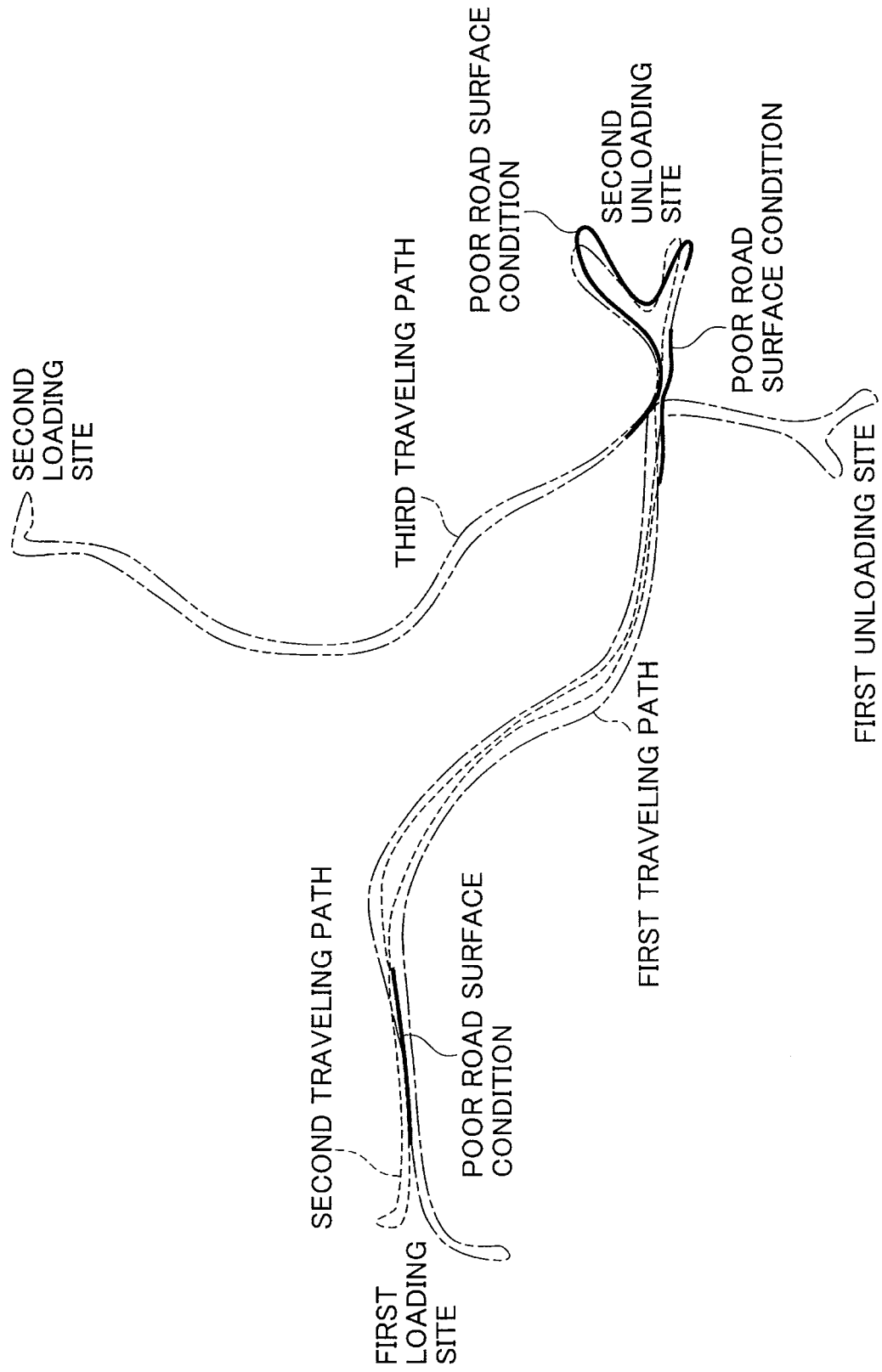
FIG. 7 is a schematic diagram showing an example of a partial enlarged view display screen which is displayed by the indicator of the management station shown in FIG. 3.

As shown in FIG. 6 (overall view display screen) and FIG. 7 (partial enlarged view display screen), for example, dump truck positions at which one of the pressures of the four suspensions 18L, 18R, 19L, and 19R was judged to be outside the reference range and the remaining three pressures were judged to be within the reference range (i.e., road surface positions judged to be in the poor condition causing a twist to the vehicle bodies 9 of the dump trucks 2) are displayed by using a different color, different line type, etc. Therefore, in this embodiment, road surface conditions that tend to damage the dump trucks 2 can be detected and the positions of such road surfaces can be displayed. As a result, the manager of the system can order the drivers of road repair vehicles (e.g., motor graders) to repair the road surfaces tending to damage the dump trucks 2. Consequently, the operating life of the dump trucks 2 can be extended.

Further, the indicator 17A of each dump truck 2 shows the map display of the loading sites, the unloading sites, and the traveling paths of the dump trucks 2 together with the mark display of the current position of the dump truck 2. Furthermore, the aforementioned road surface positions judged to be in the poor condition are displayed by using a different color, different line type, etc. This allows the drivers of the dump trucks 2 to drive carefully at such positions. Consequently, harmful influences on the dump trucks 2 can be reduced considerably.

Moreover, each dump truck 2 in this embodiment is equipped with the traveling speed sensor 12 and the pressure sensors 20A-20D as detection means for the calculation of the live load. The results of the detection by the detection means are used also for the judgment on the road surface condition. Since it is unnecessary to newly provide detection means for the judgment on the road surface condition, the number of components and the cost can be reduced. In addition, cost reduction can be achieved compared to the conventional techniques employing a millimeter wave sensor (e.g., Patent Document 1).

Incidentally, while the map generated by the server 4 of the management station 3 is displayed not only on the indicator 17B of the management station 3 but also on the indicators 17A of the dump trucks 2 in the above first embodiment, the method of displaying of the map is not restricted to this example. For example, the map may be displayed exclusively on the indicator 17B of the management station 3, without displaying the map on the indicators 17A of the dump trucks 2. While the indicator 17B of the management station 3 in the above first embodiment displays the traveling paths of the dump trucks 2 together with the current positions of the excavators 1 and the dump trucks 2, the displaying method is not restricted to this example. For example, the displaying of the current positions of the excavators 1 and the dump trucks 2 may be left out. Even in such cases, the manager of the system can order the drivers of the road repair vehicles to repair the road surfaces tending to damage the dump trucks 2, and consequently, the operating life of the dump trucks 2 can be extended.

Although not particularly explained in the above first embodiment, the road surface information generation unit 25 of the server 4 may also be configured to evaluate the poor condition of the road surface in a stepped manner (stepped evaluation means) based on the magnitude of the influence coefficient outside the preset range in the case where one of the four influence coefficients $\beta(FL)$, $\beta(FR)$, $\beta(RL)$ and $\beta(RR)$ is judged to be outside the preset range (e.g., $\beta<0.95$ or $1.05<\beta$) and the remaining three influence coefficients are judged to be within the preset range (e.g., $0.95 \le \beta \le 1.05$). Specifically, the poor condition of the road surface may be evaluated as a first-stage poor condition if the influence coefficient outside the preset range is within a first-stage range (e.g., $0.90 \le \beta < 0.95$ or $1.05 < \beta \le 1.10$), and as a second-stage poor condition when the influence coefficient outside the preset range is within a second-stage range (e.g., $\beta < 0.90$ or $1.10 < \beta$). The different stages of the poor condition may be displayed on the indicators 17A and 17B by using different colors, different line types, etc. In such a modification (modified example), the priority order of the road surface maintenance/repair work can be determined with ease.

While the road surface information generation unit 25 of the server 4 of the management station 3 in the above first embodiment makes the judgment on whether each of the pressures of the four suspensions 18L, 18R, 19L, and 19R is within the reference range which has been set for each suspension or not according to the aforementioned process shown in FIG. 5, the process for the judgment is not restricted to this example. For example, in cases where the pressures P(FL) and P(FR) of the front wheel suspensions 18L and 18R are equal to the pressures P(RL) and P(RR) of the rear wheel suspensions 19L and 19R when the dump truck 2 is traveling on a flat road/land having no irregularities, the division of the pressures P(FL), P(FR), P(RL) and P(RR) by the reference value PF/PR may be left out. In cases where the influence of the traveling speed of the dump truck 2 on the pressures P(FL), P(FR), P(RL) and P(RR) of the suspensions 18L, 18R, 19L, and 19R is little, the calculation of the average value and the ratios to the average value may be left out. In cases where the influences of the live load and the vehicle body tilting angle are little, the reference range may be fixed. Also in such cases, effects similar to the aforementioned effects can be achieved.

A second embodiment in accordance with the present invention will be described below by referring to FIGS. 8-10. In this embodiment, components equivalent to those in the first embodiment are assigned the already used reference characters and repeated explanation thereof is omitted properly.

Figure 8:
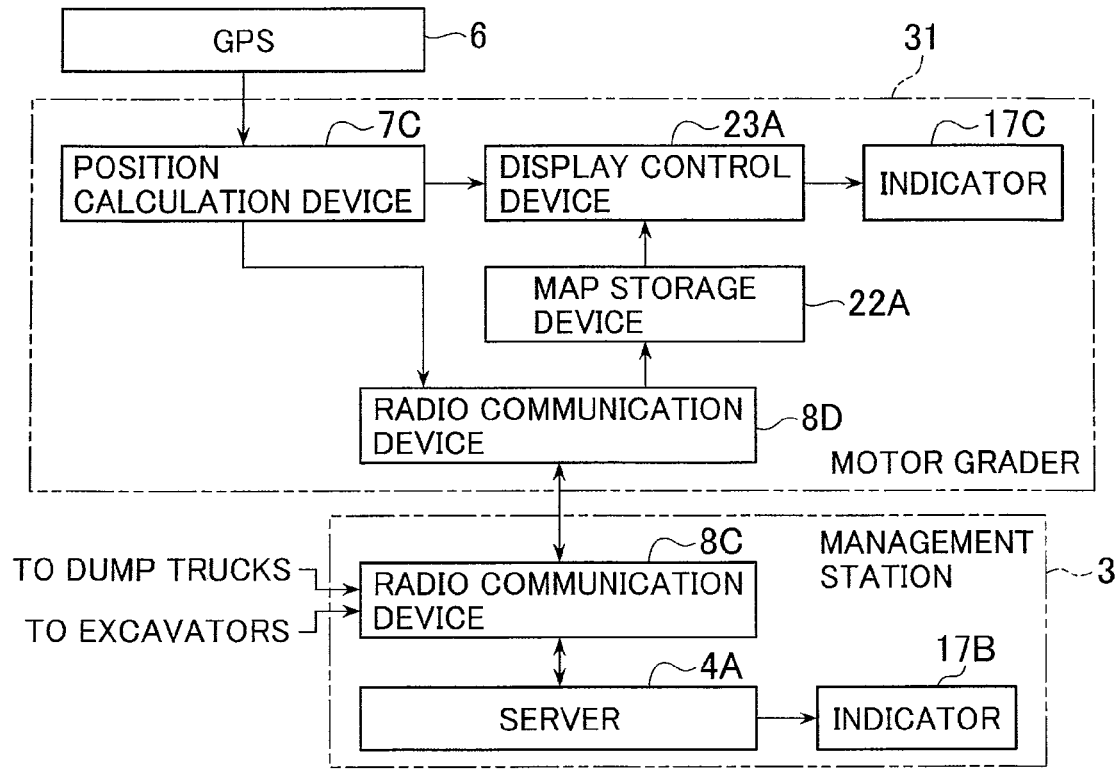
FIG. 8 is a block diagram partially showing the control configuration of a traffic management system in accordance with a second embodiment of the present invention.

FIG. 8 is a block diagram partially showing the control configuration of a traffic management system in accordance with the second embodiment of the present invention.

In this embodiment, a server 4A of the management station 3, communicating information with excavators 1, dump trucks 2 and motor graders 31 (examples of the road repair vehicles) via the radio relay stations 5, manages the positions of the excavators 1, the dump trucks 2 and the motor graders 31 while also managing the road surface condition of the traveling lanes for the dump trucks 2.

The motor grader 31 comprises a position calculation device 7C, a radio communication device 8D, a map storage device 22A and a display control device 23A. The position calculation device 7C calculates the current position of the motor grader 31 based on signals received from GPS satellites 6. The radio communication device 8D transmits the positional information of the motor grader 31 calculated by the position calculation device 7C to the management station 3 while receiving map data from the management station 3. The map storage device 22A stores the map data received from the management station 3. The display control device 23A makes an indicator 17C (display means) display the map stored in the map storage device 22A together with the current position of the motor grader 31.

The server 4A receives the positional information from the excavators 1 and the motor graders 31 via the radio communication device 8C while also receiving data including the positional information from the dump trucks 2. Similarly to the aforementioned server 4, the server 4A generates a map based on the data received from the dump trucks 2 and stores the generated map. Specifically, the server 4A is configured to judge that the road surface at the position of a traveling dump truck 2 is in a poor condition (condition causing a twist to the vehicle body 9 of the dump truck 2) and add the road surface information to the map if one of the pressures of the suspensions 18L, 18R, 19L, and 19R of the dump truck 2 is judged to be outside the reference range and the remaining three pressures are judged to be within the reference range. Further, the server 4A makes the indicator 17B display the generated map together with the current positions of the excavators 1, the dump trucks 2 and the motor graders 31. Furthermore, the server 4A transmits data of the generated map to the dump trucks 2 and the motor graders 31 via the radio communication device 8C.

Also in this embodiment configured as above, effects similar to those of the first embodiment can be achieved.

Figure 9:
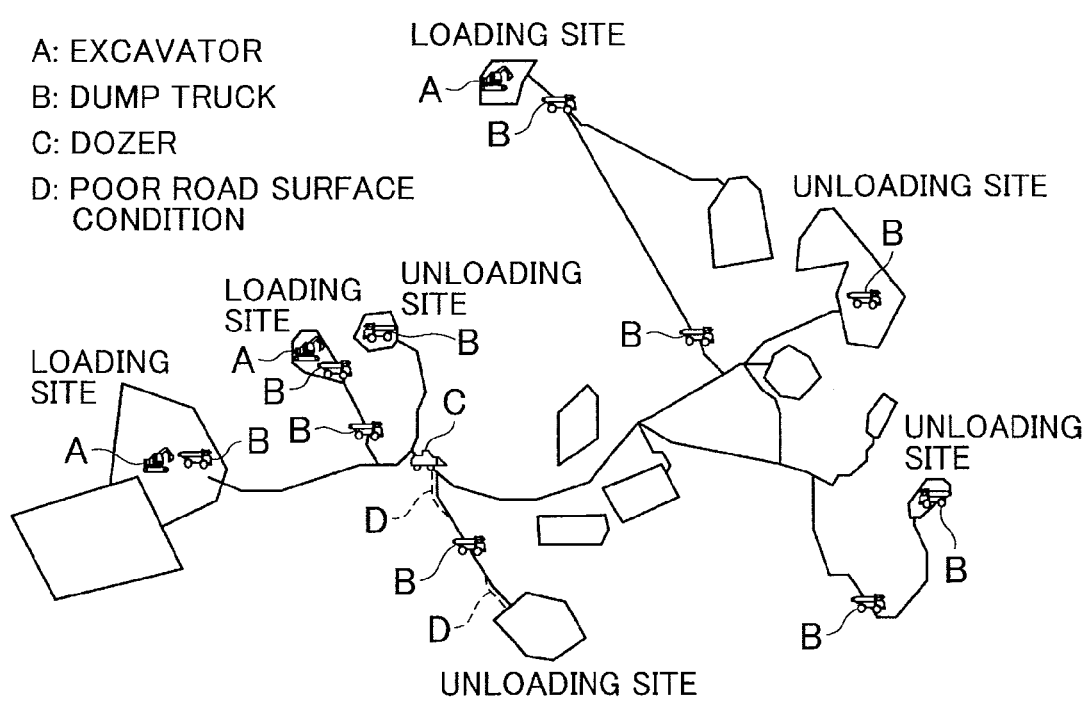
FIG. 9 is a schematic diagram showing an example of an overall view display screen which is displayed by an indicator of a management station shown in FIG. 8.

Specifically, as shown in FIG. 9 (overall view display screen), for example, the indicator 17B of the management station 3 shows the map display of the loading sites and the unloading sites together with the mark display of the current positions of the excavators 1. The indicator 17B also shows the map display of the traveling paths of the dump trucks 2 together with the mark display of the current positions of the dump trucks 2. The indicator 17B also shows the mark display of the current positions of the motor graders 31.

As shown in FIG. 9 (overall view display screen), for example, road surface positions judged to be in the poor condition causing a twist to the vehicle bodies 9 of the dump trucks 2 are displayed by using a different color, different line type, etc. Therefore, road surface conditions that tend to damage the dump trucks 2 can be detected and the positions of such road surfaces can be displayed also in this embodiment. As a result, the manager of the system can order the drivers of the motor graders 31 to repair the road surfaces tending to damage the dump trucks 2. Consequently, the operating life of the dump trucks 2 can be extended.

The indicator 17C of the motor grader 31 shows the map display of the loading sites and the unloading sites together with the mark display of the traveling paths of the dump trucks 2 and the mark display of the current position of the motor grader 31. Further, the aforementioned road surface positions judged to be in the poor condition are displayed by using a different color, different line type, etc. This allows the drivers of the motor graders 31 to drive the motor graders 31 to such positions and carry out the maintenance/repair work at the positions. Consequently, the operating life of the dump trucks 2 can be extended.

Incidentally, while the map generated by the server 4A of the management station 3 is displayed on the indicator 17B of the management station 3 and the indicators 17C of the motor graders 31 in the above second embodiment, the method of displaying of the map is not restricted to this example. For example, the map may be displayed exclusively on the indicators 17C of the motor graders 31. Also in this case, the road surfaces tending to damage the dump trucks 2 can be repaired, and consequently, the operating life of the dump trucks 2 can be extended.

In the above first and second embodiments, the server 4/4A of the management station 3 is equipped with the traveling path generation unit 24 which generates the traveling path of each dump truck based on the position record of the dump truck 2 and the road surface information generation unit 25 which judges the road surface condition of the traveling path of each dump truck 2 based on the traveling speed, the live load, the vehicle body tilting angle, and the pressures of the suspensions 18L, 18R, 19L, and 19R of the dump truck 2 and generates road surface information by associating the result of the judgment with the position of the dump truck 2. However, the implementation of the traveling path generation unit 24 and the road surface information generation unit 25 is not restricted to this example. For example, the information storage device 21 of each dump truck 2 may be equipped with functions equivalent to the traveling path generation unit 24 and the road surface information generation unit 25. Also in this case, effects similar to the aforementioned effects can be achieved.

While the information storage device 21 of each dump truck 2 has the function of calculating the live load in the above first and second embodiments, the implementation of the live load calculation function is not restricted to this example. For example, the server 4/4A of the management station 3 may be equipped with the live load calculation function. Also in this case, effects similar to the aforementioned effects can be achieved.

While the suspensions 18L, 18R, 19L, and 19R are implemented by hydraulic cylinders and pressures of the hydraulic cylinders are detected as the state quantities of the suspensions in the above first and second embodiments, it is also possible to implement the suspensions 18L, 18R, 19L, and 19R by pneumatic cylinders and detect the pressures of the pneumatic cylinders as the state quantities of the suspensions, for example. It is also possible to implement the suspensions 18L, 18R, 19L, and 19R by springs and detect the contraction levels of the springs as the state quantities of the suspensions. In this case, displacement sensors for respectively detecting the contraction levels of the four suspensions may be provided as the suspension state quantity detection means. The server may be configured to judge that the road surface at the position of a traveling dump truck 2 is in the poor condition (condition causing a twist to the vehicle body 9 of the dump truck 2) if one of the contraction levels of the four suspensions of the dump truck 2 is judged to be outside a reference range and the remaining three contraction levels are judged to be within the reference range. Also in such cases, effects similar to the aforementioned effects can be achieved.

DESCRIPTION OF REFERENCE CHARACTERS

2: dump truck
3: management station
4: server
4A: server
7B: position calculation device
10L, 10R: front wheel
11L, 11R: rear wheel
12: speed sensor
17A-17C: indicator
18L, 18R: front wheel suspension
19L, 19R: rear wheel suspension
20A-20D: pressure sensor

The invention claimed is:

1. A road surface management system for managing the road surface condition of traveling lanes for dump trucks (2) used in quarries or construction sites, comprising:
   suspension state quantity detection means (20A-20D) which detect state quantities of four suspensions (18L, 18R, 19L, 19R) provided corresponding to the left front, right front, left rear, and right rear wheels (10L, 10R, 11L, 11R) of each dump truck (2);
   position acquisition means (7B) which acquires the position of the dump truck (2);
   traveling speed detection means (12) which detects the traveling speed of the dump truck (2);
   traveling judgment means (25) which judges that the dump truck (2) is traveling if the traveling speed of the dump truck (2) detected by the traveling speed detection means (12) is higher than or equal to a preset threshold value;
   suspension state quantity judgment means (25) which judges whether each of the state quantities of the four suspensions (18L, 18R, 19L, 19R) detected by the suspension state quantity detection means (20A-20D) is within a reference range which has been set for each suspension or not in regard to each position of the traveling dump truck (2);
   road surface condition judgment means (25) which judges that the road surface at the position of a dump truck (2) is in a poor condition if one of the state quantities of the four suspensions (18L, 18R, 19L, 19R) of the dump truck is judged to be outside the reference range and the remaining three state quantities are judged to be within the reference range; and
   display means (17A; 17B; 17C) which displays the positions of the road surfaces judged by the road surface condition judgment means (25) to be in the poor condition.

2. The road surface management system according to claim 1, wherein
   each of the four suspensions (18L, 18R, 19L, 19R) is implemented by a hydraulic cylinder, and
   the suspension state quantity detection means (20A-20D) detect pressures of the four hydraulic cylinders as the state quantities of the four suspensions (18L, 18R, 19L, 19R).

3. The road surface management system according to claim 1, comprising traveling path generation means (24) which generates a traveling path of each dump truck (2) based on a position record of the dump truck (2) acquired by the position acquisition means (7B), wherein
   the display means (17A; 17B; 17C) displays the traveling paths of the dump trucks (2) generated by the traveling path generation means (24) together with the positions of the road surfaces judged by the road surface condition judgment means (25) to be in the poor condition.

4. The road surface management system according to claim 1, wherein the display means (17B; 17C) is installed in at least one of a management station (3) and a road repair vehicle (31).

5. The road surface management system according to claim 1, wherein
   the suspension state quantity judgment means (25) includes:
   reference value setting means which sets a reference value for each of the state quantities of the four suspensions (18L, 18R, 19L, 19R) according to a live load and a vehicle body tilting angle of the dump truck (2);
   influence degree calculation means which calculates influence degrees of the four suspensions (18L, 18R, 19L, 19R) by dividing the state quantities of the four suspensions (18L, 18R, 19L, 19R) detected by the suspension state quantity detection means (20A-20D) respectively by the corresponding reference values;
   influence coefficient calculation means which calculates the average value of the influence degrees of the four suspensions (18L, 18R, 19L, 19R) calculated by the influence degree calculation means and calculates influence coefficients as the ratios of the influence degrees of the four suspensions (18L, 18R, 19L, 19R) to the average value in regard to each position of the traveling dump truck (2); and
   influence coefficient judgment means which judges whether the influence coefficients of the four suspensions (18L, 18R, 19L, 19R) calculated by the influence coefficient calculation means are within a preset range or not in regard to each position of the traveling dump truck (2), and wherein
   the road surface condition judgment means (25) judges that the road surface at the position of a dump truck (2) is in the poor condition if one of the influence coefficients of the four suspensions (18L, 18R, 19L, 19R) of the dump truck is judged to be outside the preset range and the remaining three influence coefficients are judged to be within the preset range.

6. The road surface management system according to claim 5, comprising stepped evaluation means (25) which evaluates the poor condition of the road surface in a stepped manner based on the magnitude of the influence coefficient outside the preset range in the case where one of the influence coefficients of the four suspensions (18L, 18R, 19L, 19R) is judged to be outside the preset range and the remaining three influence coefficients are judged to be within the preset range, wherein the display means (17A; 17B; 17C) displays the positions of the road surfaces judged by the road surface condition judgment means (25) to be in the poor condition together with stages of the poor condition evaluated by the stepped evaluation means (25).

7. The road surface management system according to claim 4, wherein the display means (17A) is installed in the dump truck (2).

* * * * *